(12) United States Patent
Tachibana et al.

(10) Patent No.: US 10,197,724 B2
(45) Date of Patent: Feb. 5, 2019

(54) OPTICAL FIBER CORE AND OPTICAL FIBER RIBBON CORE

(71) Applicant: SUMITOMO ELECTRIC INDUSTRIES, LTD., Osaka-shi, Osaka (JP)

(72) Inventors: Kumiko Tachibana, Yokohama (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/512,965

(22) PCT Filed: Dec. 25, 2014

(86) PCT No.: PCT/JP2014/084304
§ 371 (c)(1),
(2) Date: Mar. 21, 2017

(87) PCT Pub. No.: WO2016/047002
PCT Pub. Date: Mar. 31, 2016

(65) Prior Publication Data
US 2017/0307814 A1    Oct. 26, 2017

(30) Foreign Application Priority Data

Sep. 26, 2014    (JP) .................................. 2014-196848

(51) Int. Cl.
*G02B 6/02*        (2006.01)
*C03C 25/24*       (2018.01)
(Continued)

(52) U.S. Cl.
CPC ........ *G02B 6/02395* (2013.01); *C03C 25/106* (2013.01); *C03C 25/1065* (2013.01);
(Continued)

(58) Field of Classification Search
CPC .............. G02B 6/02395; G02B 6/4403; G02B 6/4482; C03C 25/101; C03C 25/106
See application file for complete search history.

(56) References Cited

U.S. PATENT DOCUMENTS 4,334,733 A * 6/1982 Takeshima ....... B29D 11/00663
385/128
4,655,545 A * 4/1987 Yamanishi .......... C03C 25/1065
385/141

(Continued)

FOREIGN PATENT DOCUMENTS

EP         1790668 A1 *  5/2007  ............. A61L 15/60
JP        H05-306147 A    11/1993
(Continued)

*Primary Examiner* — Peter Radkowski
(74) *Attorney, Agent, or Firm* — Drinker Biddle & Reath LLP (57) ABSTRACT

An optical fiber comprises a glass fiber having a core and a cladding with which the core is covered, and a coating resin layer with which the glass fiber is covered, the coating resin layer having a colored layer of a thickness of 10 μm or more, wherein a change rate of a yellow index of the coating resin layer after aging due to temperature and humidity under an environment of 85° C. and 85% RH for 30 days is 5 or less per day.

5 Claims, 3 Drawing Sheets

US 10,197,724 B2
Page 2

(51) Int. Cl.
*C03C 25/47* (2018.01)
*C03C 25/106* (2018.01)
*G02B 6/44* (2006.01)
*C03C 25/1065* (2018.01)
*C03C 25/475* (2018.01)

(52) U.S. Cl.
CPC .............. *C03C 25/24* (2013.01); *C03C 25/47* (2018.01); *C03C 25/475* (2018.01); *G02B 6/4403* (2013.01); *G02B 6/4482* (2013.01); *G02B 6/4486* (2013.01)

(56) References Cited

U.S. PATENT DOCUMENTS

| | | | | |
|---|---|---|---|---|
| 4,745,159 | A * | 5/1988 | Anzai | C08F 8/48 525/329.9 |
| 4,954,575 | A * | 9/1990 | Sasaki | C08F 8/48 525/329.9 |
| 5,096,968 | A * | 3/1992 | Sasaki | C08F 8/32 525/142 |
| 5,096,976 | A * | 3/1992 | Sasaki | C08F 8/32 525/330.5 |
| 5,138,015 | A * | 8/1992 | Yagii | C08G 18/701 252/182.2 |
| 5,139,817 | A * | 8/1992 | Abe | B05D 3/063 264/446 |
| 5,185,188 | A * | 2/1993 | Abe | B29C 59/005 264/446 |
| 5,296,273 | A * | 3/1994 | Abe | B05D 3/063 427/393.5 |
| 5,470,943 | A * | 11/1995 | Sakata | C08G 73/1039 528/170 |
| 5,585,187 | A * | 12/1996 | Shinonaga | C08L 53/00 427/307 |
| 5,804,311 | A * | 9/1998 | Suwa | C03C 25/106 385/145 |
| 5,904,983 | A * | 5/1999 | Chan | C03C 13/046 385/123 |
| 6,187,835 | B1 * | 2/2001 | Szum | C03C 25/106 428/30 |
| 6,309,747 | B1 * | 10/2001 | Suwa | C03C 25/106 385/123 |
| 6,316,516 | B1 * | 11/2001 | Chien | C03C 25/106 427/515 |
| 6,326,416 | B1 * | 12/2001 | Chien | C03C 25/106 522/91 |
| 6,399,158 | B1 * | 6/2002 | Kuwahara | B05D 3/067 118/622 |
| 6,596,787 | B1 * | 7/2003 | Levandoski | C09J 4/06 522/109 |
| 6,638,616 | B2 * | 10/2003 | Tortorello | C03C 25/1065 428/378 |
| 6,794,460 | B2 * | 9/2004 | Asano | C08F 8/16 525/328.8 |
| 6,838,546 | B2 * | 1/2005 | Okamoto | B32B 15/08 524/431 |
| 6,846,557 | B2 * | 1/2005 | Higashi | B29C 45/14811 428/327 |
| 7,135,229 | B2 * | 11/2006 | Tortorello | C03C 25/1065 385/114 |
| 7,169,702 | B2 * | 1/2007 | El-Hibri | C08G 75/20 438/31 |
| 7,234,881 | B2 * | 6/2007 | Koike | B29C 45/0053 264/261 |
| 7,257,299 | B2 * | 8/2007 | Chien | G02B 6/4482 385/114 |
| 7,289,706 | B2 * | 10/2007 | Chien | G02B 6/4482 385/114 |
| 7,423,110 | B2 * | 9/2008 | El-Hibri | C08G 75/20 438/31 |
| 7,463,417 | B2 * | 12/2008 | Duncan | C08F 265/04 359/487.04 |
| 7,662,909 | B2 * | 2/2010 | El-Hibri | C08G 75/20 438/31 |
| 7,676,130 | B2 * | 3/2010 | Chien | C03C 25/106 385/123 |
| 7,737,231 | B2 * | 6/2010 | Handa | A61L 15/18 526/227 |
| 7,767,728 | B2 * | 8/2010 | Lu | C08F 2/48 264/1.1 |
| 7,852,435 | B2 * | 12/2010 | Fujisawa | G02B 5/0221 349/112 |
| 7,923,483 | B2 * | 4/2011 | Chien | G02B 6/4482 106/31.13 |
| 8,318,051 | B2 * | 11/2012 | Adachi | B29C 65/1677 156/272.8 |
| 8,404,797 | B2 * | 3/2013 | Kawabe | C08F 212/00 264/1.1 |
| 8,477,267 | B2 * | 7/2013 | Fujisawa | G02B 5/0221 349/112 |
| 8,592,994 | B2 * | 11/2013 | Tachibana | C08L 63/00 257/778 |
| 8,617,708 | B2 * | 12/2013 | Murakami | C08F 2/001 428/402 |
| 8,709,586 | B2 * | 4/2014 | Yano | B29B 9/14 428/297.4 |
| 8,748,520 | B2 * | 6/2014 | Kitagawa | C08K 5/3492 524/100 |
| 8,957,140 | B2 * | 2/2015 | Amasaki | C07D 251/24 524/100 |
| 8,975,314 | B2 * | 3/2015 | Amasaki | C07D 409/14 524/100 |
| 9,006,378 | B2 * | 4/2015 | van den Bogerd | C08K 5/1515 528/196 |
| 9,229,159 | B2 * | 1/2016 | Sohma | G02B 1/04 |
| 9,290,614 | B2 * | 3/2016 | Ohara | A43B 13/04 |
| 9,334,371 | B2 * | 5/2016 | Nakamura | C08G 75/08 |
| 9,394,397 | B2 * | 7/2016 | Ohara | A43B 13/04 |
| 9,475,903 | B2 * | 10/2016 | Yamasaki | C07C 263/20 |
| 9,477,012 | B2 * | 10/2016 | Yamasaki | C07C 263/20 |
| 9,593,091 | B2 * | 3/2017 | Kaujalgikar | C07D 301/12 |
| 9,638,850 | B2 * | 5/2017 | Matsuoka | G02B 1/105 |
| 9,725,588 | B2 * | 8/2017 | Watanabe | C08L 33/12 |
| 9,738,757 | B2 * | 8/2017 | Nakamura | C08G 75/08 |
| 2001/0025062 | A1 * | 9/2001 | Szum | C03C 25/106 522/96 |
| 2002/0018943 | A1 * | 2/2002 | Baba | G02B 5/223 430/7 |
| 2002/0044749 | A1 * | 4/2002 | Koike | B29C 45/0053 385/95 |
| 2002/0151615 | A1 * | 10/2002 | Tortorello | C08G 18/165 521/155 |
| 2002/0177684 | A1 * | 11/2002 | Kratschmer | C08G 59/10 528/99 |
| 2003/0004278 | A1 * | 1/2003 | Asano | C08F 8/16 525/330.6 |
| 2003/0054187 | A1 * | 3/2003 | Higashi | B29C 45/14811 428/520 |
| 2003/0134988 | A1 * | 7/2003 | Asano | C08F 8/16 525/330.6 |
| 2004/0048946 | A1 * | 3/2004 | Tortorello | C03C 25/1065 522/174 |
| 2004/0091686 | A1 * | 5/2004 | Okamoto | B32B 15/08 428/209 |
| 2004/0218117 | A1 * | 11/2004 | Matsuoka | G02B 1/105 349/96 |
| 2005/0003661 | A1 * | 1/2005 | El-Hibri | C08G 75/20 438/643 |
| 2005/0085604 | A1 * | 4/2005 | Handa | A61L 15/18 526/227 |
| 2005/0176923 | A1 * | 8/2005 | El-Hibri | C08G 75/20 528/373 |
| 2006/0100391 | A1 * | 5/2006 | Matsumoto | C08L 35/00 525/418 |
| 2006/0115649 | A1 * | 6/2006 | Chien | C03C 25/106 428/375 |
| 2007/0036510 | A1 * | 2/2007 | Ingman | B81B 7/0077 385/147 |

(56) References Cited

U.S. PATENT DOCUMENTS

| | | | |
|---|---|---|---|
| 2007/0078247 A1* | 4/2007 | Winningham | C08F 220/36 526/286 |
| 2007/0122093 A1* | 5/2007 | Chien | G02B 6/4482 385/114 |
| 2007/0122094 A1* | 5/2007 | Chien | G02B 6/4482 385/114 |
| 2007/0123692 A1* | 5/2007 | El-Hibri | C08G 75/20 528/391 |
| 2007/0160828 A1* | 7/2007 | Iyama | C08K 5/3475 428/332 |
| 2007/0188864 A1* | 8/2007 | Duncan | C08F 265/04 359/489.11 |
| 2007/0191506 A1* | 8/2007 | Lu | C08F 2/48 522/178 |
| 2007/0197749 A1* | 8/2007 | Matsuda | A61L 15/60 526/230 |
| 2007/0238801 A1* | 10/2007 | Chien | G02B 6/4482 522/64 |
| 2008/0045623 A1* | 2/2008 | Yamaguchi | C03C 25/101 522/83 |
| 2008/0116426 A1* | 5/2008 | Adachi | B29C 65/1677 252/582 |
| 2008/0182930 A1* | 7/2008 | Adachi | B29C 65/16 524/403 |
| 2008/0186429 A1* | 8/2008 | Hamamatsu | G02B 5/0242 349/64 |
| 2009/0075078 A1* | 3/2009 | Yano | B29B 9/14 428/375 |
| 2009/0123749 A1* | 5/2009 | Ui | C03C 25/106 428/375 |
| 2009/0156747 A1* | 6/2009 | Lu | C08F 2/48 525/221 |
| 2009/0190067 A1* | 7/2009 | Hamamatsu | G02B 5/0242 349/64 |
| 2009/0297819 A1* | 12/2009 | Yano | C08L 23/02 428/297.4 |
| 2010/0032826 A1* | 2/2010 | Tachibana | C08L 63/00 257/692 |
| 2010/0178471 A1* | 7/2010 | Adachi | B29C 65/16 428/174 |
| 2011/0014434 A1* | 1/2011 | Tanaka | C08J 5/04 428/184 |
| 2011/0024701 A1* | 2/2011 | Furukawa | C07D 409/14 252/589 |
| 2011/0077331 A1* | 3/2011 | Kitagawa | C08K 5/3492 524/100 |
| 2011/0105638 A1* | 5/2011 | Kawabe | C08F 212/00 522/182 |
| 2012/0136098 A1* | 5/2012 | Amasaki | C07D 251/24 524/100 |
| 2012/0169973 A1* | 7/2012 | Matsuoka | G02B 1/105 349/96 |
| 2012/0195065 A1* | 8/2012 | Hyakuta | G02B 6/0043 362/602 |
| 2012/0196127 A1* | 8/2012 | Murakami | C08F 2/001 428/402 |
| 2012/0301696 A1* | 11/2012 | Watanabe | C08J 5/18 428/220 |
| 2012/0321265 A1* | 12/2012 | Terruzzi | C03C 25/1065 385/128 |
| 2013/0035448 A1* | 2/2013 | Ohara | A43B 13/04 525/440.16 |
| 2013/0037310 A1* | 2/2013 | Kimura | C08J 5/24 174/251 |
| 2013/0320665 A1* | 12/2013 | Gard | C10M 107/32 285/94 |
| 2013/0338395 A1* | 12/2013 | Ohara | A43B 13/04 560/180 |
| 2014/0063838 A1* | 3/2014 | Kouzmina | G02B 6/0005 362/558 |
| 2014/0079362 A1* | 3/2014 | Sohma | G02B 1/04 385/123 |
| 2014/0121293 A1* | 5/2014 | Nakamura | C08G 75/08 522/168 |
| 2014/0213703 A1* | 7/2014 | Amasaki | C07D 409/14 524/100 |
| 2014/0213704 A1* | 7/2014 | Amasaki | C07D 403/04 524/100 |
| 2014/0234622 A1* | 8/2014 | Mundra | C08K 5/101 428/394 |
| 2014/0357765 A1* | 12/2014 | van den Bogerd | C08K 5/1515 523/451 |
| 2015/0005420 A1* | 1/2015 | Mundra | C08K 5/0016 524/114 |
| 2015/0070933 A1* | 3/2015 | van den Bogerd | F21S 48/1225 362/611 |
| 2015/0087789 A1* | 3/2015 | Utsunomiya | C08G 63/16 525/424 |
| 2015/0239197 A1* | 8/2015 | Hosomi | H05K 9/009 428/34.1 |
| 2015/0247289 A1* | 9/2015 | Kawaguchi | D21H 17/52 162/132 |
| 2015/0342276 A1* | 12/2015 | Yamasaki | C08G 18/12 2/67 |
| 2015/0346387 A1* | 12/2015 | Yamasaki | C08G 18/12 528/85 |
| 2015/0368431 A1* | 12/2015 | Ghosh-Dastidar | C08K 5/0016 428/375 |
| 2016/0222168 A1* | 8/2016 | Nakamura | C08G 75/08 |
| 2016/0264771 A1* | 9/2016 | Watanabe | C08L 33/12 |
| 2016/0272751 A1* | 9/2016 | Ohara | A43B 13/04 |
| 2016/0281886 A1* | 9/2016 | Mizutani | B32B 27/00 |
| 2017/0088695 A1* | 3/2017 | Mundra | C08K 9/02 |
| 2017/0217937 A1* | 8/2017 | Kawai | C07D 403/12 |
| 2017/0242187 A1* | 8/2017 | Iwaguchi | G02B 6/02395 |
| 2017/0242209 A1* | 8/2017 | Tachibana | G02B 6/4403 |
| 2017/0247528 A1* | 8/2017 | Ghosh-Dastidar | C08K 5/1515 |
| 2017/0260323 A1* | 9/2017 | Fujikawa | C08G 59/68 |

FOREIGN PATENT DOCUMENTS

| | | | |
|---|---|---|---|
| JP | H06-242355 A | 9/1994 | |
| JP | H07-104155 A | 4/1995 | |
| JP | H11-311723 A | 11/1999 | |
| JP | 2000-086302 A | 3/2000 | |
| JP | 2002357813 A * | 12/2002 | |
| JP | 2003041109 A * | 2/2003 | |
| JP | 2003-279811 A | 10/2003 | |
| JP | 2005-105003 A | 4/2005 | |
| JP | 2005239741 A * | 9/2005 | |
| JP | 2006206862 A * | 8/2006 | |
| JP | 2007-108279 A | 4/2007 | |
| JP | 2007-256609 A | 10/2007 | |
| JP | 2009-181119 A | 8/2009 | |
| JP | 2012158672 A * | 8/2012 | C09D 11/101 |
| JP | 2013-167762 A | 8/2013 | |
| JP | 2016070966 A * | 5/2016 | C03C 25/24 |

* cited by examiner

OPTICAL FIBER CORE AND OPTICAL FIBER RIBBON CORE

TECHNICAL FIELD

The present invention relates to an optical fiber and an optical fiber ribbon.

BACKGROUND ART

In general, an optical fiber has a protective coating layer for protecting a glass fiber, and also has a thin colored layer (hereinafter, referred to as "ink layer") for distinguishing, as the outermost layer (see, for example, Patent Literature 1). An optical fiber coated with a primary resin layer and the secondary resin layer is wound up once, and thereafter the optical fiber is unwound and the ink layer is formed on the outer periphery of a secondary resin layer. That is, the optical fiber usually has a coating having a three-layered structure of the primary resin layer, the secondary resin layer and the ink layer.

On the other hand, production of an optical fiber by coloring a protective coating layer without any ink layer provided (see, for example, Patent Literature 2) is investigated.

CITATION LIST

Patent Literature

[Patent Literature 1] JP H06-242355 A
[Patent Literature 2] JP 2013-167762 A

SUMMARY OF INVENTION

Technical Problem

The thickness of the ink layer is about several μm, and is much less than the thicknesses of the primary resin layer and the secondary resin layer. In an optical fiber ribbon in which the optical fiber having the ink layer as the outermost layer is used, adhesiveness between the ink layer and the secondary layer may be deteriorated over time, and so-called "color peeling", a phenomenon in which the ink layer is peeled from the optical fiber in an operation for removal of a ribbon material and taking out of the optical fiber, may occur.

In order to prevent color peeling, it is considered that the ink layer is omitted and the primary resin layer or the secondary resin layer constituting the protective coating layer is colored. If the protective coating layer is colored, however, the color of the optical fiber may be changed by resin yellowing over time.

An object of the present invention is then to provide an optical fiber comprising a coating resin layer in which the change in color over time is suppressed without the occurrence of any color peeling of a colored layer.

Solution to Problem

In order to solve the above problem, an optical fiber according to one embodiment comprises: a glass fiber having a core and a cladding with which the core is covered; and a coating resin layer with which the glass fiber is covered; the coating resin layer having a colored layer of a thickness of 10 μm or more, wherein a change rate of a yellow index of the coating resin layer after aging due to temperature and humidity under an environment of 85° C. and 85% RH for 30 days is 5 or less per day.

Advantageous Effects of Invention

According to the present invention, it is possible to provide an optical fiber and an optical fiber ribbon comprising a coating resin layer in which the change in color over time is suppressed without the occurrence of any color peeling of a colored layer.

DESCRIPTION OF EMBODIMENTS

[Description of Embodiments of the Present Invention]

First, the content of embodiments of the present invention is recited and described. An optical fiber according to one embodiment of the present invention comprises a glass fiber having a core and a cladding with which the core is covered, and a coating resin layer with which the glass fiber is covered, the coating resin layer having a colored layer of a thickness of 10 μm or more, wherein a change rate of a yellow index (YI value) of the coating resin layer after aging due to temperature and humidity under an environment of 85° C. and 85% RH for 30 days is 5 or less per day.

In the optical fiber of the present embodiment, the coating resin layer for protecting the glass fiber is colored to thereby make formation of any ink layer unnecessary, and thus color peeling of the optical fiber can be prevented. In addition, the composition of the colored layer can be close to the composition of other resin layer(s), and therefore the colored layer is easily integrated with other resin layers even in the case of two or more layers. Furthermore, the optical fiber of the present invention can be efficiently produced because the need of attachment of the colored layer in another step is cut out.

In the optical fiber, the gel fraction of the coating resin layer may be more than 75% by mass. Thus, the degree of curing of the coating resin layer increases, and color peeling and the change in color over time of the colored layer are more easily suppressed. It is preferable from the same viewpoints that the amount of an unreacted photoinitiator in the coating resin layer be 3% by mass or less.

The coating resin layer may contain a titanium (Ti) element. Thus, the change in color over time of the coating resin layer is easily suppressed. In addition, any colorant of various colors is used for the colored layer from the viewpoint of an enhancement in distinguishability. Examples of the colorant include a dye and a pigment, and use of a pigment excellent in water resistance and weather resistance is suitable for coloration of the optical fiber.

An optical fiber ribbon according to one embodiment of the present invention comprises a plurality of the optical fibers. The optical fiber of the present embodiment is used, and therefore the optical fiber can be easily distinguished without the occurrence of any color peeling in an operation for removal of the ribbon material from the optical fiber ribbon and takeoff of the optical fiber.

[Detail of Embodiments of the Present Invention]

Specific examples of an optical fiber according to an embodiment of the present invention and a production method thereof are described below with reference to the drawings. It is herein intended that the present invention is not limited to such examples, is represented by the claims, and encompasses all modifications within the meaning and the scope equivalent to the claims. In the following description, the same element is represented by the same symbol in the description of the drawings, and overlapping description is omitted.

(Fiber)

Figure 1:
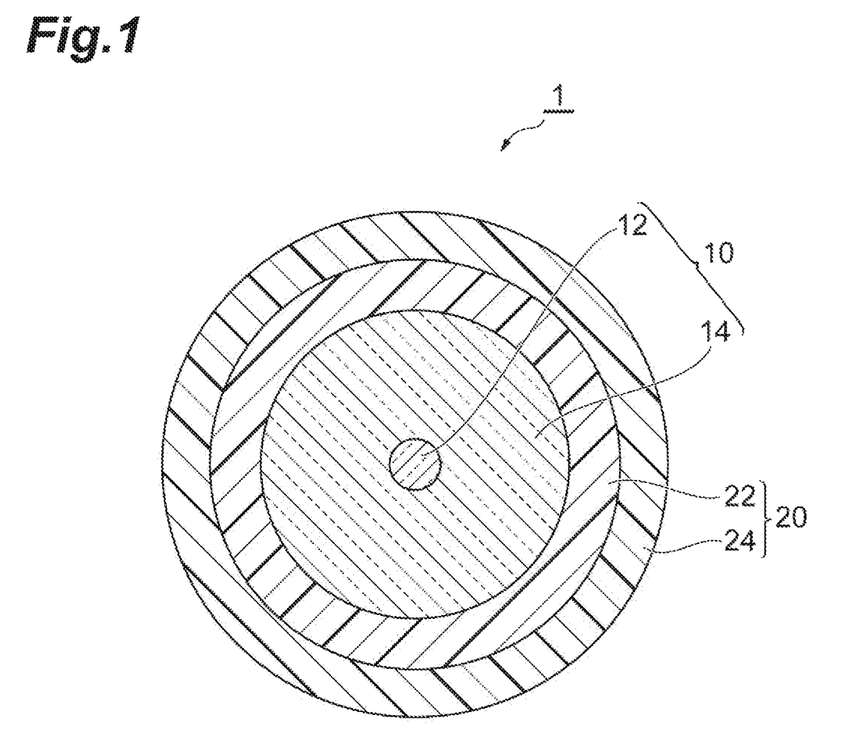
FIG. 1 is a cross-sectional view illustrating one example of an optical fiber according to the present embodiment.

FIG. 1 is a cross-sectional view illustrating one example of an optical fiber 1 according to the present embodiment. As illustrated in FIG. 1, the optical fiber 1 of the present embodiment comprises a glass fiber 10 that is an optical transmitter and a coating resin layer 20.

The glass fiber 10 has a core 12 and a cladding 14, and includes a glass member, for example, $SiO_2$ glass. The glass fiber 10 transmits light introduced to the optical fiber 1. The core 12 is provided in, for example, a region including the center axial line of the glass fiber 10. The core 12 includes pure $SiO_2$ glass, or may additionally include $GeO_2$, a fluorine element or the like. The cladding 14 is provided in a region surrounding the core 12. The cladding 14 has a refractive index lower than the refractive index of the core 12. The cladding 14 may include pure $SiO_2$ glass, or may include $SiO_2$ glass to which a fluorine element is added.

The coating resin layer 20 may be configured from only one layer or a plurality of layers as long as it has a colored layer of 10 μm or more. For example, as illustrated in FIG. 1, when the coating resin layer 20 has a primary resin layer 22 and a secondary resin layer 24, at least one of the primary resin layer 22 and the secondary resin layer 24 may be a colored layer. It is preferable that the secondary resin layer 24 be a colored layer from the viewpoint of an enhancement in distinguishability of the optical fiber 1.

Figure 2:
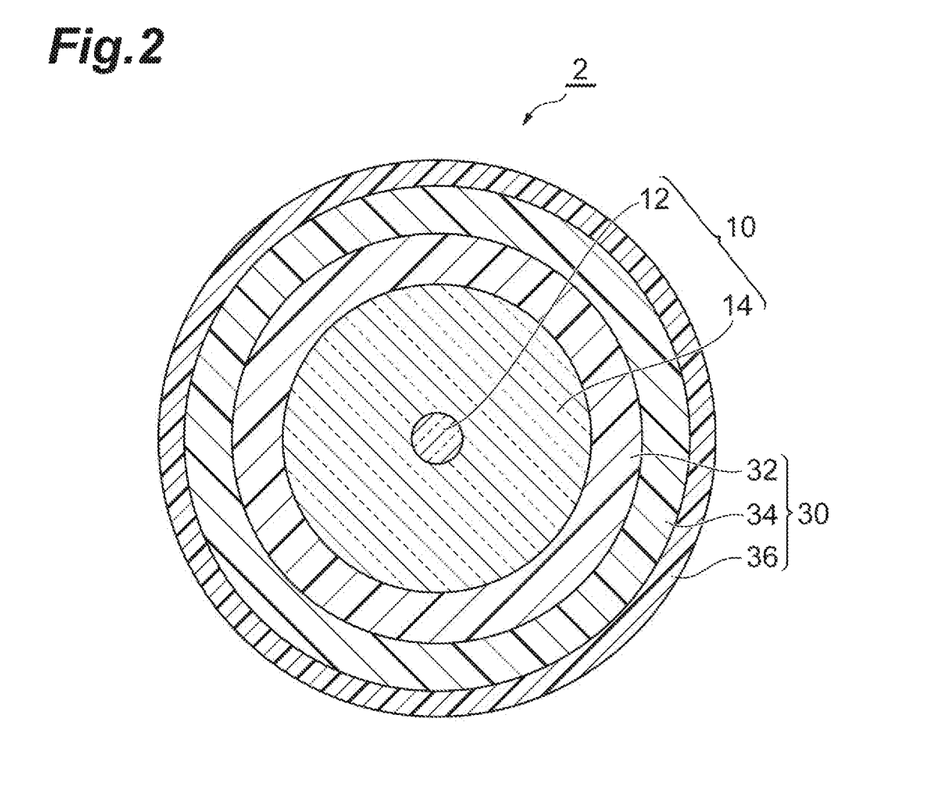
FIG. 2 is cross-sectional view illustrating a conventional optical fiber.

The optical fiber of the present embodiment is different in configuration from a conventional optical fiber in terms of having no ink layer. As illustrated in FIG. 2, a conventional optical fiber 2 includes a glass fiber 10 and a coating resin layer 30, and the coating resin layer 30 has an ink layer 36 as the outermost layer, in addition to a primary resin layer 32 and a secondary resin layer 34.

The thickness of the colored layer is 10 μm or more, preferably 10 to 70 μm, more preferably 10 to 50 μm, further preferably 20 to 40 μm. When the thickness of the colored layer is 10 μm or more, it is possible to suppress color peeling.

The thickness of the primary resin layer 22 is usually about 20 to 50 μm, and when the primary resin layer 22 serves as the colored layer, the thickness of the primary resin layer 22 corresponds to the thickness of the colored layer. The thickness of the secondary resin layer 24 is usually about 20 to 40 μm, and when the secondary resin layer 24 serves as the colored layer, the thickness of the secondary resin layer 24 corresponds to the thickness of the colored layer.

The Young's modulus of the primary resin layer 22 is preferably 1 MPa or less at room temperature, more preferably 0.5 MPa or less. The Young's modulus of the secondary resin layer 24 is preferably 600 to 1000 MPa. In the present description, the room temperature here refers to 23° C.

The coating resin layer 20 can be formed by, for example, curing an ultraviolet curable resin composition containing an oligomer, a monomer and a photopolymerization initiator.

Examples of the oligomer include urethane (meth)acrylates and epoxy (meth)acrylates. The oligomer can be used as a mixture of two or more.

The urethane (meth)acrylates include those obtained by reacting a polyol compound, a polyisocyanate compound and a hydroxyl group-containing acrylate compound. Examples of the polyol compound include polytetramethylene glycol, polypropylene glycol, bisphenol A-ethylene oxide adduct diol and the like. The polyisocyanate compound include 2,4-tolylene diisocyanate, 2,6-tolylene diisocyanate, isophorone diisocyanate and the like. Examples of the hydroxyl group-containing acrylate compound include 2-hydroxy (meth)acrylate, 2-hydroxyethyl (meth)acrylate, 2-hydroxybutyl (meth)acrylate, 1,6-hexanediol mono(meth) acrylate, pentaerythritol tri(meth)acrylate, 2-hydroxypropyl (meth)acrylate, tripropylene glycol di(meth)acrylate and the like. As the epoxy (meth)acrylate, for example, one obtained by reacting an epoxy compound and (meth)acrylic acid can be used.

The (meth)acrylate here means acrylate, or methacrylate corresponding thereto. Much the same is true on (meth) acrylic acid.

The content of the oligomer is preferably 50 to 90% by mass, more preferably 35 to 85% by mass based on the total amount of the ultraviolet curable resin composition.

As the monomer, a monofunctional monomer having one polymerizable group or a polyfunctional monomer having two or more polymerizable groups can be used.

The monofunctional monomer include N-vinyl monomers having a cyclic structure, such as N-vinylpyrrolidone, N-vinylcaprolactam and (meth)acryloylmorpholine; and (meth) acrylate compounds such as isobornyl (meth)acrylate, tricyclodecanyl (meth)acrylate, benzyl (meth)acrylate, dicyclopentanyl (meth)acrylate, 2-hydroxyethyl (meth)acrylate, nonylphenyl (meth)acrylate, phenoxyethyl (meth)acrylate and polypropylene glycol mono(meth)acrylate. Among them, an N-vinyl monomer having a cyclic structure is preferable from the viewpoint of an enhancement in curing speed.

The polyfunctional monomer include polyethylene glycol di(meth)acrylate, tricyclodecanediyl dimethylene di(meth) acrylate, bisphenol A-ethylene oxide adduct diol di(meth) acrylate, trimethylolpropane tri(meth)acrylate, and the like.

The monomer can be used as a mixture of two or more. The content of the monomer is preferably 5 to 45% by mass, more preferably 10 to 30% by mass based on the total amount of the ultraviolet curable resin composition.

The photopolymerization initiator can be appropriately selected from known radical photopolymerization initiators, and used, and examples include an acyl phosphine oxide type initiator and an acetophenone type initiator.

The acyl phosphine oxide type initiator include 2,4,6-trimethylbenzoyl diphenylphosphine oxide (produced by BASF SE, trade name "Lucirin TPO"), 2,4,4-trimethylpentyl phosphine oxide, 2,4,4-trimethylbenzoyl diphenylphosphinoxide, and the like.

The acetophenone type initiator include 1-hydroxycyclohexan-1-yl phenyl ketone (produced by BASF SE, trade name "Irgacure 184"), 2-hydroxy-2-methyl-1-phenyl-propan-1-one (produced by BASF SE, trade name "Darocure 1173"), 2,2-dimethoxy-1,2-diphenylethan-1-one (produced by BASF SE, trade name "Irgacure 651"), 2-methyl-1-(4-methylthiophenyl)-2-morpholinopropan-1-one (produced by BASF SE, trade name "Irgacure 907"), 2-benzyl-2- dimethylamino-1-(4-morpholinophenyl)-butanone-1 (produced by BASF SE, trade name "Irgacure 369"), 1-hydroxycyclohexyl phenyl ketone, 2,2-dimethoxy-2-phenylacetophenone, 1-(4-isopropylphenyl)-2-hydroxy-2-methylpropan-1-one, and the like.

The photopolymerization initiator can be used as a mixture of two or more. The content of the photopolymerization initiator is preferably 0.1 to 10% by mass, more preferably 0.3 to 7% by mass based on the total amount of the ultraviolet curable resin composition.

It is preferable that the coating resin layer contain a Ti element, and it is more preferable that a resin layer serving as the colored layer contain titanium oxide. An ultraviolet curable resin composition containing titanium oxide can be used to thereby form a colored layer high in the degree of curing by ultraviolet irradiation, and easily suppress the change in color of the colored layer over time. The reason for this is considered because titanium oxide in the resin layer scatters ultraviolet light. The amount of the Ti element in the coating resin layer is preferably 0.06 to 1.8% by mass, more preferably 0.12 to 0.90% by mass. It is preferable to be compounded so that the amount of titanium oxide to be added to the coating resin layer is 0.1 to 3% by mass, more preferably 0.2 to 1.5% by mass based on the sum amount of the coating resin layer 20.

It is preferable that the colored layer contain a pigment from the viewpoint of an enhancement in distinguishability of the optical fiber. The pigment include coloring pigments such as carbon black, titanium oxide and zinc flower, magnetic powders such as $\gamma$-$Fe_2O_3$, a mixed crystal of $\gamma$-$Fe_2O_3$ and $\gamma$-$Fe_3O_4$, $CrO_2$, cobalt ferrite, iron oxide to which cobalt adheres, barium ferrite, Fe—Co and Fe—Co—Ni, and inorganic pigments such as MIO, zinc chromate, strontium chromate, aluminum tripolyphosphate, zinc, alumina, glass and mica. In addition, an organic pigment such as an azo type pigment, a phthalocyanine type pigment, or a dyeing lake pigment can also be used. The pigment may be subjected to various treatments such as surface modification and formation of a composite pigment. The pigment may be preferably added so as to be included in an amount of 0.1 to 5% by mass, more preferably 0.12 to 3.2% by mass, based on the sum amount of the coating resin layer 20.

As the method of forming the coating resin layer 20 on the glass fiber 10, a method that has been conventionally used for production of an optical fiber can be applied.

For example, the coating resin layer 20 is formed by coating the cladding 14 with a curable resin composition, and curing the curable resin composition by irradiation with ultraviolet light. At least one of an ultraviolet LED and an ultraviolet lamp is here used as an ultraviolet light source.

When the coating resin layer 20 has the primary resin layer 22 and the secondary resin layer 24, a system (wet-on-dry system) may be used in which the cladding 14 is coated with a curable resin composition for the primary resin layer, the composition is cured by irradiation with ultraviolet light to form the primary resin layer 22, and thereafter the primary resin layer 22 is coated with a curable resin composition for the secondary resin layer and the composition is cured by irradiation with ultraviolet light to form the secondary resin layer 24. Alternatively, a system (wet-on-wet system) may be used in which the cladding 14 is coated with a curable resin composition for the primary resin layer and thereafter coated with a curable resin composition for the secondary resin layer, and the compositions are simultaneously cured by irradiation with ultraviolet light to form the primary resin layer 22 and the secondary resin layer 24.

In the optical fiber of the present embodiment, the change rate of the YI value of the coating resin layer 20 after aging due to temperature and humidity under an environment of 85° C. and 85% RH for 30 days is 5 or less per day. When the change rate of the YI value is 5 or less, the colored layer is small in the change in color over time and is excellent in distinguishability. The change rate of the YI value of the coating resin layer 20 can be reduced by adding titanium oxide to a resin material or by sufficiently curing the coating resin layer.

The degree of curing of the coating resin layer 20 is preferably higher from the viewpoints that the change in YI value of the optical fiber over time can be suppressed and distinguishability is enhanced. That is, the gel fraction of the coating resin layer 20 is preferably more than 75% by mass, more preferably 78% by mass or more, further preferably 80% by mass or more.

The amount of the unreacted photoinitiator in the coating resin layer 20 is preferably 3% by mass or less, more preferably 2% by mass or less, further preferably 1% by mass or less. A large amount of the unreacted initiator is not preferable because loss increases upon immersion of the optical fiber ribbon using the optical fiber of the present embodiment in hot water (60° C.).

(Optical Fiber Ribbon)

Figure 3:
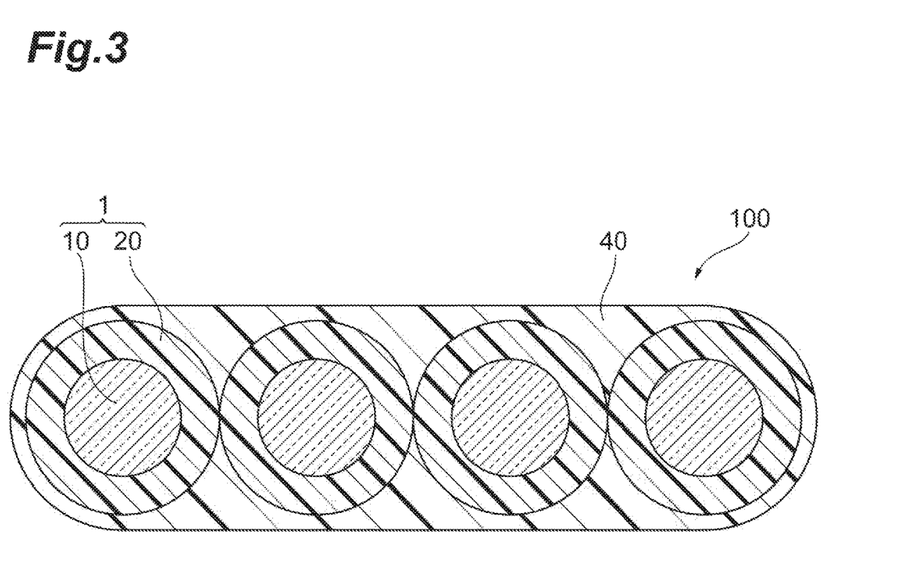
FIG. 3 is a cross-sectional view illustrating one example of an optical fiber ribbon according to the present embodiment.

The optical fiber of the present embodiment can be used to produce an optical fiber ribbon. FIG. 3 is a cross-sectional view of an optical fiber ribbon 100 according to the present embodiment. The optical fiber ribbon 100 illustrated in the same figure is one in which a plurality of (4 in the case) the optical fiber 1 are arranged in parallel and integrated by a ribbon material 40. The ribbon material 40 is formed by, for example, an epoxy acrylate resin, a urethane acrylate resin or the like. Such an optical fiber ribbon can allow the optical fiber to be easily distinguished in an operation for removal of the ribbon material from the optical fiber ribbon and takeoff of the optical fiber, without the occurrence of any color peeling.

EXAMPLES

Next, the present invention is described in detail with reference to Examples, but the present invention is not limited to these Examples.

Preparation Example 1

Resin composition A was prepared by mixing a urethane acrylate oligomer (75 parts by mass) consisting of polypropylene glycol having a number average molecular weight of 3000, 2,4-tolylene diisocyanate and 2-hydroxyethyl acrylate, as an oligomer, N-vinylcaprolactam (10 parts by mass) as a monomer, Lucirin TPO (3 parts by mass) as a photopolymerization initiator, and a silane coupling agent (1 part by mass).

Preparation Example 2

Resin composition B was prepared by mixing an urethane acrylate (75 parts by mass) consisting of polypropylene glycol having a number average molecular weight of 1000, 2,4-tolylene diisocyanate and 2-hydroxyethyl acrylate, as an oligomer, bisphenol A-ethylene oxide adduct diol diacrylate (10 parts by mass) as a monomer, and Irgacure 184 (3 parts by mass) as a photopolymerization initiator.

Preparation Example 3

Resin composition C was prepared by mixing an urethane acrylate (75 parts by mass) consisting of polypropylene glycol having a number average molecular weight of 1000, 2,4-tolylene diisocyanate and 2-hydroxyethyl acrylate, as an oligomer, bisphenol A-ethylene oxide adduct diol diacrylate (10 parts by mass) as a monomer, Irgacure 184 (3 parts by mass) as a photopolymerization initiator, and copper phthalocyanine and titanium oxide as pigments so that the amount thereof was 0.2% by mass based on the sum amount of the coating resin layer and the amount thereof was 3% by mass based on the sum amount of the coating resin layer, respectively.

Preparation Example 3-1

Resin composition C1 was prepared in the same manner as in Preparation Example 3 except that the amount of titanium oxide was changed to 1.5% by mass.

Preparation Example 3-2

Resin composition C2 was prepared in the same manner as in Preparation Example 3 except that the amount of titanium oxide was changed to 0.2% by mass.

Preparation Example 3-2

Resin composition C3 was prepared in the same manner as in Preparation Example 3 except that the amount of titanium oxide was changed to 0.1% by mass.

Preparation Example 4

Resin composition D was prepared by mixing an urethane acrylate (75 parts by mass) consisting of polypropylene glycol having a number average molecular weight of 1000, 2,4-tolylene diisocyanate and 2-hydroxyethyl acrylate, as an oligomer, bisphenol A-ethylene oxide adduct diol diacrylate (10 parts by mass) as a monomer, Irgacure 184 (3 parts by mass) as a photopolymerization initiator, and copper phthalocyanine as a pigment so that the amount thereof was 0.2% by mass based on the sum amount of the coating resin layer.

Example 1

A primary resin layer having a thickness of 55 μm was formed on the outer periphery of a glass fiber having a diameter of 125 μm, the fiber being configured from a core and a cladding, by resin composition A, and a secondary resin layer (colored layer) having a thickness of 10 μm was further formed on the outer periphery of the resultant by resin composition C, to obtain an optical fiber having a diameter of 255 μm illustrated in FIG. 1. The linear velocity was 1000 m/min.

Example 2

An optical fiber was produced by the same operation as in Example 1 except that the linear velocity was 500 m/min.

Example 3

An optical fiber was produced by the same operation as in Example 1 except that a primary resin layer having a thickness of 45 μm was formed and a secondary resin layer (colored layer) having a thickness of 20 μm was formed.

Example 4

An optical fiber was produced by the same operation as in Example 3 except that the linear velocity was 750 m/min.

Example 5

An optical fiber was produced by the same operation as in Example 3 except that a secondary resin layer (colored layer) was formed by resin composition C1.

Example 6

An optical fiber was produced by the same operation as in Example 4 except that a secondary resin layer (colored layer) was formed by resin composition C2.

Example 7

An optical fiber was produced by the same operation as in Example 3 except that a secondary resin layer (colored layer) was formed by resin composition C3.

Example 8

An optical fiber was produced by the same operation as in Example 1 except that a primary resin layer having a thickness of 35 μm was formed and a secondary resin layer (colored layer) having a thickness of 30 μm was formed.

Comparative Example 1

An optical fiber was produced by the same operation as in Example 1 except that a secondary resin layer (colored layer) having a thickness of 10 μm was formed by use of resin composition D.

Comparative Example 2

A primary resin layer having a thickness of 40 μm was formed on a glass fiber having a diameter of 125 μm, the fiber being configured from a core and a cladding, by resin composition A, and a secondary resin layer having a thickness of 20 μm was further formed on the outer periphery of the resultant by resin composition B. This was wound up once, and thereafter, while the optical fiber was anew unwound, an ink layer (colored layer) having a thickness of 5 μm was formed on the outer periphery of the secondary resin layer by resin composition C in a coloring machine. Thus, an optical fiber having a diameter of 255 μm illustrated in FIG. 2 was obtained.

Comparative Example 3

An optical fiber was produced by the same operation as in Comparative Example 2 except that an ink layer (colored layer) having a thickness of 5 μm was formed by use of resin composition D (no titanium oxide).

Comparative Example 4

An optical fiber was produced by the same operation as in Example 1 except that a primary resin layer having a thickness of 60 μm was formed by use of resin composition A and a secondary resin layer (colored layer) having a thickness of 5 µm was formed by use of resin composition C.

[Evaluation Methods]

Each of the optical fibers produced was evaluated as follows. The evaluation results are shown in Table 1 and Table 2.

(1) Amount of Titanium (Ti) Element in Coating Resin

After 10 ml of sulfuric acid and 5 ml of nitric acid were added to 0.2 g of the optical fiber (including 0.12 g of a coating resin) and the resultant was warmed for 10 minutes after generation of white smoke, 1 ml of perchloric acid was added thereto and warmed until the insoluble fraction disappeared. Thereafter, the amount of Ti was measured by ICP.

(2) Gel Fraction

The optical fiber whose weight was measured in advance was immersed in methyl ethyl ketone (MEK) at 60° C. for 17 hours, and thereafter dried at 100° C. for 2 hours and naturally cooled to room temperature, thereafter the weight thereof was measured, and the gel fraction of the coating layer was thus measured according to the following expression.

Gel fraction(%)=(Weight of coating after immersion in MEK and drying/Weight of coating before immersion in MEK)×100

(3) Amount of Unreacted Initiator

The optical fiber whose weight was measured in advance was subjected to Soxhlet extraction (120° C.×1 hour) with acetone, and the unreacted initiator remaining in the coating resin layer was extracted. Next, the amount of the unreacted initiator extracted in acetone was measured by use of GCMS.

(4) YI Value

A sample, where the optical fiber was aligned in a size of 1 cm×5 cm so that no gaps were provided and the optical fiber was not overlapped, was degraded in a thermo-hygrostat bath set at 85° C. and 85% RH for 30 days. The inside of the thermostat bath was a dark place where light and the like of a fluorescent lamp did not reach. The YI value before and after aging was measured according to JIS K 7373.

Change rate of YI value=[(YI after aging at 85° C. and 85% RH for 30 days)−(YI before aging at 85° C. and 85% RH for 30 days)]/30

(5) Color Peeling

Four of the optical fibers were prepared to produce an optical fiber ribbon illustrated in FIG. 3. As the ribbon material 40 of the optical fiber ribbon, a resin composition having the following composition was used.

The above resin composition contains 18 parts by mass of urethane acrylate obtained by reacting 1 mol of bisphenol A-ethylene oxide adduct diol, 2 mol of tolylene diisocyanate and 2 mol of hydroxyethyl acrylate, 10 parts by mass of urethane acrylate obtained by reacting 1 mol of polytetramethylene glycol, 2 mol of tolylene diisocyanate and 2 mol of hydroxyethyl acrylate, 15 parts by mass of tricyclodecane diacrylate obtained by reacting 1 mol of tolylene diisocyanate and 2 mol of hydroxyethyl acrylate, 10 parts by mass of N-vinylpyrrolidone, 10 parts by mass of isobornyl acrylate, 5 parts by mass of bisphenol A-ethylene oxide adduct diol diacrylate, 0.7 parts by mass of 2-methyl-1-[4-(methylthio)phenyl]-2-morpholino-propan-1-one (Irgacure 907 produced by Chiba Specialty Chemicals Co. Ltd.), and 1.3 parts by mass of 2,4,6-trimethylbenzoyldiphenyl phosphine oxide (Lucirin TPO, produced by BASF SE).

The optical fiber ribbon was degraded in a thermo-hygrostat bath set at 85° C. and 85% RH for 30 days. The inside of the thermostat bath was a dark place where light and the like of a fluorescent lamp did not reach. The optical fiber was taken by single fiber separation from the optical fiber ribbon degraded, according to Telcordia GR-20 5.3.1, and the presence of peeling of each of the colored layer and the ink layer was confirmed. In Tables 1 and 2, a case where no peeling was observed was rated as "OK", and a case where peeling was observed was rated as "NG".

(6) Distinguishability

The sample degraded, used in YI value measurement, was visually observed under an environment of an illuminance of 300 Lx, and distinguishability was confirmed. In Tables 1 and 2, a case where distinguishing could be made was rated as "OK", and a case where distinguishing could not be made was rated as "NG".

(7) Increase in Hot Water Loss

The optical fiber ribbon was immersed in hot water at 60° C. for 30 days, and the transmission loss at a wavelength of 1.55 µm was measured before the immersion and at 30 days after the immersion by the OTDR method. The loss level measured was used to calculate the increase in hot water loss (Δα) by the following expression. In Tables 1 and 2, a case where the Δα was 0.05 dB/km or less was rated as "OK", and a case where the Δα was more than 0.05 dB/km was rated as "NG".

Δα (dB/km)=loss (in hot water at 60° C. after 30 days)−loss (before immersion)   Expression:

TABLE 1

|  | Example 1 | Example 2 | Example 3 | Example 4 | Example 5 | Example 6 | Example 7 | Example 8 |
|---|---|---|---|---|---|---|---|---|
| Thickness of colored layer (µm) | 10 | 10 | 20 | 20 | 20 | 20 | 20 | 30 |
| The number of layers in coating resin layer | 2 | 2 | 2 | 2 | 2 | 2 | 2 | 2 |
| Change rate of YI | 5 | 1 | 5 | 3 | 5 | 5 | 5 | 5 |
| Amount of Ti (% by mass) | 1.8 | 1.8 | 1.8 | 1.8 | 0.9 | 0.12 | 0.06 | 1.8 |
| Gel fraction (% by mass) | 80 | 95 | 80 | 85 | 80 | 80 | 78 | 80 |
| Amount of unreacted initiator (% by mass) | 2 | 0.5 | 2 | 1 | 2 | 2 | 3 | 2 |
| After temperature/humidity test — Color peeling | OK | OK | OK | OK | OK | OK | OK | OK |
| After temperature/humidity test — Distinguishability | OK | OK | OK | OK | OK | OK | OK | OK |
| Increase in loss in hot water | OK | OK | OK | OK | OK | OK | OK | OK |

TABLE 2

| | Comparative Example 1 | Comparative Example 2 | Comparative Example 3 | Comparative Example 4 |
|---|---|---|---|---|
| Thickness of colored layer (μm) | 10 | 5 | 5 | 5 |
| The number of layers in coating resin layer | 2 | 3 | 3 | 2 |
| Change rate of YI | 6 | 3 | 3 | 1 |
| Amount of Ti (% by mass) | 0 | 1.8 | 0 | 1.8 |
| Gel fraction (% by mass) | 75 | 85 | 85 | 80 |
| Amount of unreacted initiator (% by mass) | 4 | 1 | 1 | 3 |
| After temperature/humidity test — Color peeling | OK | NG | NG | NG |
| After temperature/humidity test — Distinguishability | NG | OK | OK | OK |
| Increase in loss in hot water | NG | OK | OK | OK |

The optical fibers produced in Examples had no occurrence of color peeling of the colored layer after the temperature/humidity test, was also excellent in distinguishability, and also had no problem about the increase in loss in hot water.

On the other hand, the optical fiber produced in Comparative Example 1 was low in gel fraction and had a large amount of the unreacted initiator, and therefore was largely changed in terms of YI and was poor in distinguishability. In addition, the amount of the unreacted initiator was large and therefore the increase in loss in hot water was also large. The optical fibers produced in Comparative Examples 2 and 3 had the occurrence of color peeling of the ink layer. The optical fiber produced in Comparative Example 4 had a thin colored layer, and therefore had the occurrence of color peeling.

REFERENCE SIGNS LIST

1, 2: optical fiber, 10: glass fiber, 12: core, 14: cladding, 20, 30: coating resin layer, 22, 32: primary resin layer, 24, 34: secondary resin layer, 36: ink layer, 40: ribbon material, and 100: optical fiber ribbon.

The invention claimed is:

1. An optical fiber comprising:
  a glass fiber having a core and a cladding with which the core is covered, and a coating resin layer with which the glass fiber is covered;
  the coating resin layer having a primary coating resin layer covering the glass fiber and a secondary coating resin layer covering the primary coating resin layer, wherein
  at least one of the primary coating resin layer and the secondary coating resin layer is a colored layer of a thickness of 10 μm or more,
  the colored layer contains a titanium element, and
  a change rate of a yellow index (YI) of the coating resin layer after aging due to temperature and humidity under an environment of 85° C. and 85% RH for 30 days is 5 or less per day.

2. The optical fiber according to claim 1, wherein a gel fraction of the coating resin layer is more than 75% by mass.

3. The optical fiber according to claim 1, wherein an amount of an unreacted photoinitiator in the coating resin layer is 3% by mass or less.

4. The optical fiber according to claim 1, wherein the colored layer contains a pigment.

5. An optical fiber ribbon comprising a plurality of the optical fibers according to claim 1.

* * * * *